United States Patent [19]
Benson

[11] Patent Number: 6,046,818
[45] Date of Patent: *Apr. 4, 2000

[54] IMPOSITION IN A RASTER IMAGE PROCESSOR

[75] Inventor: Craig H. Benson, Fremont, Calif.

[73] Assignee: Adobe Systems Incorporated, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/868,045

[22] Filed: Jun. 3, 1997

[51] Int. Cl.[7] .................................................. B41B 15/00
[52] U.S. Cl. ...................... 358/1.18; 358/1.18; 358/1.15; 358/1.1; 358/1.9
[58] Field of Search ..................................... 395/116, 114, 395/101, 117, 109, 111, 115; 101/136

[56] References Cited

U.S. PATENT DOCUMENTS

5,163,368  11/1992  Penasavecchia et al. ............... 101/136
5,740,338   4/1998  Gauthier et al. ........................ 395/116

Primary Examiner—Edward L. Coles
Assistant Examiner—Twyler Lamb
Attorney, Agent, or Firm—Fish & Richardson P.C.

[57] ABSTRACT

A method and apparatus for rendering one or more page description language descriptions of pages to be printed by a printing device on a sheet. The apparatus includes an assembler, an interpreter and a rendering engine. The assembler receives as an input a job ticket including layout and page identifier information. The assembler operates to generate an ordered list of objects to be printed by the printing device on the sheet. The interpreter receives the page description language input and the ordered list and generates display list objects for each object in the ordered list. The display list objects may be stored in a display list memory. The rendering engine receives the display list objects renders the objects. The rendered objects may be printed by a print engine onto the sheet.

35 Claims, 8 Drawing Sheets

```
10 0 obj
<<                    318
/Type /MediaSource
/Media 13 0 R
>>
endobj
11 0 obj         322                              326
<<
/Type /Surface
/PlacedObjects [ 14 0 R  15 0 R  16 0 R  17 0 R  18 0 R  19 0 R  20 0 R  21 0 R ]
>>
endobj
12 0 obj         324                              328
<<
/Type /Surface
/PlacedObjects [ 22 0 R  23 0 R  24 0 R  25 0 R  26 0 R  27 0 R  28 0 R  29 0 R ]
>>
endobj
13 0 obj         319
<<                                                           320
/Type /Media
/Dimensions [ 2736.000000  1800.000000  2736.000000  1800.000000 ]
>>
endobj
14 0 obj              326
<<
/Type /PlacedObject
/Name /Page
/CTM [ 1.000000  0.000000  0.000000  1.000000  873.000000  405.000000 ]
/Clipping [ -9.000000  -9.000000  198.000000  198.000000 ]
/Ord 1
>>
endobj
15 0 obj              326
<<
/Type /PlacedObject
/Name /Page
/CTM [ 0.000046  1.000000  -1.000000  0.000046  1269.000000  405.000000 ]
/Clipping [ -9.000000  0.000000  198.000000  198.000000 ]
/Ord 1
>>
endobj
16 0 obj              326
<<
/Type /PlacedObject
/Name /Page
/CTM [ -1.000000  0.000093  -0.000093  -1.000000  1467.000000  603.000000 ]
/Clipping [ 0.000000  0.000000  198.000000  207.000000 ]
/Ord 1
>>
endobj
17 0 obj              326
<<
/Type /PlacedObject
/Name /Page
/CTM [ -0.000139  -1.000000  1.000000  -0.000139  1467.000000  603.000000 ]
/Clipping [ 0.000000  0.000000  207.000000  198.000000 ]
/Ord 1
>>
endobj
```

Labels: 330 → /Type /PlacedObject; 332 → /Name /Page; 334 → /CTM; 336 → endobj

FIG._3b

```
18 0 obj                    ← 326
<<
/Type /PlacedObject
/Name /Page
/CTM [ 1.000000  0.000000  0.000000  1.000000  873.000000  603.000000 ]
/Clipping [ -9.000000  0.000000  198.000000  198.000000 ]
/Ord 2
>>
endobj
19 0 obj                    ← 326
<<
/Type /PlacedObject
/Name /Page
/CTM [ 0.000046  1.000000  -1.000000  0.000046  1269.000000  603.000000 ]
/Clipping [ 0.000000  0.000000  198.000000  198.000000 ]
/Ord 2
>>
endobj
20 0 obj                    ← 326
<<
/Type /PlacedObject
/Name /Page
/CTM [ -1.000000  0.000093  -0.000093  -1.000000  1467.000000  801.000000 ]
/Clipping [ 0.000000  0.000000  198.000000  198.000000 ]
/Ord 2
>>
endobj
21 0 obj                    ← 326
<<
/Type /PlacedObject
/Name /Page
/CTM [ -0.000139  -1.000000  1.000000  -0.000139  1467.000000  801.000000 ]
/Clipping [ 0.000000  0.000000  198.000000  198.000000 ]
/Ord 2
>>
endobj
22 0 obj                    ← 328
<<
/Type /PlacedObject
/Name /Page
/CTM [ 1.000000  0.000000  0.000000  1.000000  1665.000000  405.000000 ]
/Clipping [ 0.000000  -9.000000  207.000000  198.000000 ]
/Ord 2
>>
endobj
23 0 obj                    ← 328
<<
/Type /PlacedObject
/Name /Page
/CTM [ 0.000046  -1.000000  1.000000  0.000046  1467.000000  603.000000 ]
/Clipping [ 0.000000  0.000000  207.000000  198.000000 ]
/Ord 1
>>
endobj
```

FIG._3c

```
24 0 obj                 ╭─ 328
<<
/Type /PlacedObject
/Name /Page
/CTM [ -1.000000  -0.000093  0.000093  -1.000000  1467.000000  603.000000 ]
/Clipping [ 0.000000  0.000000  198.000000  207.000000 ]
/Ord 1
>>
endobj
25 0 obj                 ╭─ 328
<<
/Type /PlacedObject
/Name /Page
/CTM [ -0.000139  1.000000  -1.000000  -0.000139  1269.000000  405.000000 ]
/Clipping [ -9.000000  0.000000  198.000000  198.000000 ]
/Ord 1
>>
endobj
26 0 obj                 ╭─ 328
<<
/Type /PlacedObject
/Name /Page
/CTM [ 1.000000  0.000000  0.000000  1.000000  1665.000000  603.000000 ]
/Clipping [ 0.000000  0.000000  207.000000  198.000000 ]
/Ord 2
>>
endobj
27 0 obj                 ╭─ 328
<<
/Type /PlacedObject
/Name /Page
/CTM [ 0.000046  -1.000000  1.000000  0.000046  1467.000000  801.000000 ]
/Clipping [ 0.000000  0.000000  198.000000  198.000000 ]
/Ord 2
>>
endobj
28 0 obj                 ╭─ 328
<<
/Type /PlacedObject
/Name /Page
/CTM [ -1.000000  -0.000093  0.000093  -1.000000  1467.000000  801.000000 ]
/Clipping [ 0.000000  0.000000  198.000000  198.000000 ]
/Ord 2
>>
endobj
29 0 obj                 ╭─ 328
<<
/Type /PlacedObject
/Name /Page
/CTM [ -0.000139  1.000000  -1.000000  -0.000139  1269.000000  603.000000 ]
/Clipping [ 0.000000  0.000000  198.000000  198.000000 ]
/Ord 2
>>
endobj
```

*FIG._3d*

```
xref
0 30
0000000000 65535 f
0000000009 00000 n
0000000067 00000 n
0000000145 00000 n
0000000248 00000 n
0000000336 00000 n
0000000398 00000 n
0000000457 00000 n
0000000540 00000 n
0000000630 00000 n
0000000698 00000 n
0000000758 00000 n
0000000882 00000 n
0000001006 00000 n
0000001113 00000 n
0000001316 00000 n
0000001520 00000 n
0000001725 00000 n
0000001930 00000 n
0000002132 00000 n
0000002335 00000 n
0000002540 00000 n
0000002745 00000 n
0000002948 00000 n
0000003151 00000 n
0000003356 00000 n
0000003562 00000 n
0000003764 00000 n
0000003967 00000 n
0000004172 00000 n
trailer
<<
/Root 1 0 R
>> startxref
4377
%EOF
```

IMPOSITION IN A RASTER IMAGE PROCESSOR

BACKGROUND OF THE INVENTION

The present invention relates generally to methods and systems for printing computer generated images and more particularly to methods and apparatus for formatting a sheet in preparation for printing on a printing device.

A computer system can output data to a wide variety of output display devices. Output display devices such as laser printers, plotters, imagesetters, and other printing devices produce an image or "visual representation" on a sheet of paper or the like. A printing device can print dots on a piece of paper corresponding to the information of a bitmap (or pixelmap where a pixelmap is characterized as having a depth of two or more bits). A "raster" printing device creates a visual representation by printing an array of pixels arranged in rows and columns from the bitmap.

One type of printing device is a printing press. A printing press may be used to produce books, newspapers, pamphlets, posters and other single and multi-page printed matter. The printing press advantageously prints multiple pages of printed matter at the same time onto a single sheet. Other devices used for printing multiple pages at the same time include imagesetters and plate setters.

When printing multiple pages, the individual pages are arranged in one or more sheets. Each sheet includes a layout of pages that may be ordered or otherwise optimized to facilitate post-printing processes. For example, the layout of the sheet may be arranged such that individual pages are in sequence when folding occurs.

Printing devices that produce output in response to page description language input are widely used. A page description language (PDL) is a high level language for describing objects to be displayed by an output device. A printing device may receive page description data in the form of a PDL file. In order to produce a finished sheet, the printing device interprets the data contained in the PDL file, renders objects within the data into bitmaps, and after all objects for the sheet are rendered, prints the sheet.

Imposition is the pre-printing process of arranging the pages for a sheet to achieve a proper sequence or position of each page relative to other pages. Imposition is performed to facilitate post-printing processes. These processes include fold and cut operations followed by some form of binding. Conventional imposition processes are executed on a computer workstation prior to the printing process. An imposition process operates on one or more PDL files or image data files and layout information for a given sheet. The PDL files are representative of the various pages (or sub-pages) of content to be displayed on a given sheet. The layout information describes how the pages are to be arranged to achieve the desired output result. The output of an imposition process is a single PDL file that includes all the data required (including external references if any) to print the sheet by a printing device.

SUMMARY

In general, in one aspect, the invention features a method imposing and rendering image data for a surface to be printed by a printing device. The method includes receiving one or more page description files defining a plurality of pages to be printed on a surface of a media sheet. A job ticket is received defining the layout of the pages on the surface. An ordered list of objects is constructed for the surface from the job ticket. The list is ordered according to layers. Thereafter, data from the page description files is interpreted resulting in display data. The display data is rendered in layer order to create pixelmaps. The pixelmaps are printed on the surface of the media sheet.

Preferred embodiments of the invention include one or more of the following features. The page description files are PDF files. All page description files received are translated into PDF files prior to rendering. The printing device is selected from the group of an imagesetter, a digital press, a printing press and a plate setter.

If no job ticket is received, a job ticket is built by processing a user defined signature describing the position of each page on the media sheet and determining the numbers and size of pages to be printed from each page description file received. A job ticket is created by mapping the page size into the signature to determine a list of objects to be printed for each surface of the media sheet.

The step of interpreting includes dividing the display data into bands and storing the display data in a display list memory until all the pages are interpreted. The layer ordered list of objects may be sorted according to band order.

The method further includes verifying the availability of all resources called in each page description file received. A proof may be printed on a second printing device prior to printing on the media sheet. A visual representation of the sheet may be displayed on a visual output device prior to printing on the media sheet.

In general, in another aspect, the invention features a method printing a sheet by a printing device including receiving one or more files including one or more pages of content for display on the sheet. The files are stored in a file storage device. A job ticket is received including a layout and document tree. The document tree defines which pages in the files are to be printed on the sheet. The layout tree defines the location on the sheet for each page in the document tree. An object list is derived from the job ticket including an entry for each page to be printed on the sheet. Entries in the object list are arranged in layer order and each entry includes a pointer to a page in the files stored in the file storage device. Objects are interpreted from the object list in layer order including retrieving associated pages from the file storage device and interpreting page data to create display data. The display data is stored in display lists. When all the objects from the object list have been interpreted, the display list data is rendered to create pixelmaps which are printed on the sheet.

In general, in another aspect, the invention features a method rendering an image on a sheet of media in an imagesetter configured to receive a page description language description of a plurality of pages to be printed on the sheet and having a display list memory for storing display list objects. The method includes deriving an ordered list of objects from user defined layout information for the sheet. The page description language input is interpreted according to a layer order defined by the ordered list into display list objects stored in the display list memory. Thereafter, the display list data is rendered.

In general, in another aspect, the invention features a method an imposition method for defining the layout of a sheet to be printed by a printing device. The sheet includes one or more pages of content defined by one or more page description files. The method includes receiving one or more page description files defining one or more pages for display on the sheet and user input defining the layout of the pages on the sheet. A layout for the sheet is imposed without interpreting the received page description files and without creating an intermediary page description file including the page description files. The imposing step includes building a job ticket having an ordered list of objects to be rendered on the sheet. The job ticket is derived from the user layout input and provided along with the received page description files to a printing device for printing of the sheet.

Preferred embodiments of the invention include one or more of the following features. The step of imposing includes receiving a user defined signature defining the layout of the pages to be printed on the sheet. The step of building a job ticket includes processing a user defined signature describing the position of each page on the sheet, determining the numbers and size of pages to be printed from each page description file received and creating a job ticket by mapping the page size into the signature to determine a list of objects to be printed for each surface of the sheet.

In general, in another aspect, the invention features a method of printing a sheet by a printing device where the sheet includes one or more pages of content defined by one or more page description files. The method includes receiving one or more page description files defining one or more pages for display on the sheet and user input defining the layout of the pages on the sheet. A layout for the sheet is imposed without interpreting the received page description files and without creating an intermediary page description file including original page description file data. The imposing step includes building a job ticket having an ordered list of objects to be rendered on the sheet. Data from the page description files is interpreted resulting in display data. The display data is rendered in layer order to create pixelmaps and printed on the sheet.

In general, in another aspect, the invention features a printing device configured to receive a plurality of page description language descriptions of pages to be printed on a sheet. The printing device includes an assembler connected to receive a job ticket including layout and page identifier information. The assembler operates to generate an ordered list of objects to be printed by the printer on the sheet. An interpreter is connected to receive page description language input and the ordered list and operates to generate display list objects for each object in the ordered list and cause display list objects to be stored in a display list memory. A rendering engine is coupled to the display list memory and operates to receive display list objects stored in the display list memory and to render the objects. A print engine receives the rendered objects and prints them on the sheet.

Preferred embodiments of the invention include one or more of the following features.

The printing device includes a layout generation utility that receives as an input a user defined signature describing the position of each page on the sheet and operates to determine the numbers and size of pages to be printed from each page description language description received. The layout generation utility creates a job ticket by mapping the page size into the signature to determine a list of objects to be printed for each surface of the sheet.

The printing device includes a sorting mechanism for sorting the ordered list of objects according to band order. The printing device includes a resource verifier operating to verifying the availability of all resources called in each page description language description received. A proof print routine is included operating to cause the printing of a proof on a second printing device prior to printing on the sheet. An on-screen display routine is included operating to cause the display of a visual representation of the sheet on a visual output device prior to printing on the sheet.

Among the advantages of the invention are one or more of the following. File storage requirements are minimized in the development of layout information. Original source material is operated on in the rendering process after a layout is developed thereby saving processing time by not requiring the transformation of the original source material to an intermediary form. File transfer requirements are minimized because the layout mechanism is not required to consume (interpret) the original source material or required to produce an output which includes all of the original source material. Late stage editing of the layout and of source material may be readily accomplished without having to repeat the imposition process for a given sheet.

Other features and advantages of the invention will become apparent from the following description and from the claims.

DETAILED DESCRIPTION

The present invention may be embodied in any output device that receives page description data and produces from the data visual output, for example on a piece of paper. An output device may include a prepress routine for implementing layout functions, a raster image processor for producing pixelmaps (or bitmaps depending on the depth of the resultant data) from received data and one or more engines for producing images on varied output media. The invention has particular applicability to printing presses, imagesetters, plate setters, digital presses and the like and will be described in terms of an embodiment in such a device, which will be referred to simply as an imagesetter.

Figure 1:
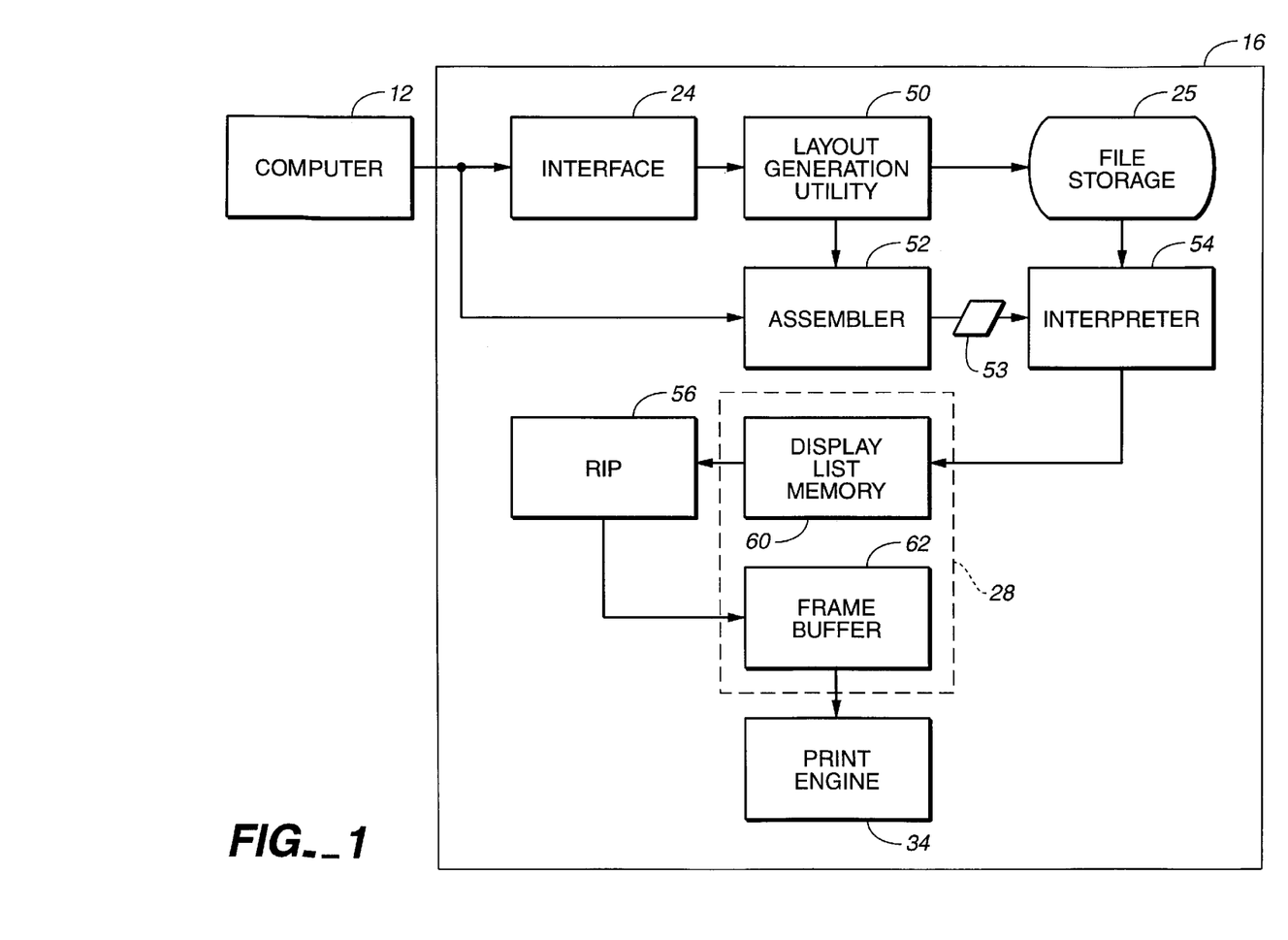
FIG. 1 is a block diagram of a printer according to the invention.

Referring to FIG. 1, an imagesetter 16 receives input data files, from a computer 12, for example, and turns the input data files into marks on a piece of paper by sending signals to a print engine 34. The imagesetter 16 is configured to receive page description language input data files and layout information from one or more users and process it as will be described later. One suitable page description language is the Portable Document Format available from Adobe Systems Incorporated of San Jose, Calif. Another suitable page description language is the PostScript® language available from Adobe Systems Incorporated of San Jose, Calif. The PostScript language is described in Adobe Systems Incorporated, Adobe PostScript® Language Reference Manual, Addison-Wesley (2d ed., ©1990). Another suitable page description language is the PCL language available from Hewlett-Packard Company of Palo Alto, Calif. Another page description language is CT and LW by Scitex America, Inc., of Bedford Mass. A page description language file sent to an imagesetter specifies objects to be displayed and related information. A PostScript object can, for example, include a pixelmap defining a pattern of pixels to be displayed, or it can reference an outline curve defining in mathematical terms a shape to be marked. The object may also include other rasterizing information such as font and size.

The imagesetter 16 includes an interface 24, file storage 25, a digital data processor, random access memory 28, and print engine 34. It also includes read-only memory, I/O interfaces, and data transfer paths and busses, none of which are shown, for storing and transferring data in support of the functions described below.

Interface 24 regulates the flow of information between imagesetter 16 and computer 12 according to a standard communication protocol. Alternatively, interface 24 may support a file transfer protocol for sharing files between computers in networks on a intranet or internet. Interface 24 may include a buffer for buffering data received from computer 12 in the event imagesetter 16 is not ready to process or otherwise unable to manipulate the received data. The buffer may be part of file storage 25.

File storage 25 is a mass storage device such as hard disk or disk array for storing files received from computer 12. Each file includes one or more objects associated with a given sheet to be outputted by the imagesetter. Imagesetter 16 may store all the files associated with a particular sheet in file storage 25 prior to rendering data objects associated with a given file. Alternatively, imagesetter 16 may begin render operations prior to the receipt of all page description files based on the availability of the job ticket and the receipt of the page description file including pages associated with the first object to be interpreted based on an ordered list. The ordered list and the interpretation process are described in greater detail below.

The processor may be a general or special purpose microprocessor operating under control of computer program instructions executed from a memory. In the embodiment illustrated in FIG. 1, the processor includes a number of special purpose sub-processors including an layout generation utility 50, an assembler 52, interpreter 54 and a raster image processor (RIP) 56. Each sub-processor may be a separate circuit able to operate substantially in parallel with the other sub-processors. Some or all of the sub-processors may be implemented as computer program processes (software) tangibly stored in a memory to perform their respective functions. These may share an instruction processor, such as a general purpose integrated circuit microprocessor, or each sub-processor may have its own microprocessor for executing instructions. Alternatively, some or all of the sub-processors may be implemented in an ASIC (application specific integrated circuit). In addition, the sub-processors may be distributed or may form a part of computer 12.

Layout generation utility 50 processes input files received from computer 12 prior to storage in file storage 25. The processing may include layout functions, such as page sizing, resource checking, file translation, on-screen viewing, and job ticket generation.

Input files may be of varying formats and include PDL files, PCL files, Portable Document Format (PDF) files, image files, and the like. Layout generation utility 50 may determine the page size for each file received (in terms of physical length and width that the page is to occupy on a printed sheet). The page size information may be coupled with layout information (signature) received from a user to create a job ticket as will be described in greater detail below.

Layout generation utility 50 may include a resource checker for determining the resources required for printing a particular page. The resource checker enables early detection of error conditions, for example Postscript errors, thereby freeing system resources early in a printing process in the event of an error condition. Examples of resources include fonts, halftones, color rendering dictionaries, and open prepress interface (OPI) files. In addition, the resource checker may check all reference calls embedded within a file to assure the objects that are called are available to imagesetter 16.

Layout generation utility 50 may include an on-screen preview function or proof print function. The on-screen preview function displays a visual representation of a sheet to be printed on a visual output display (not shown) coupled to imagesetter 16. The display of the sheet on a visual display prior to printing allows a user to adjust layout parameters as required prior to printing a final image on the media. The on-screen preview function may be invoked before or after rendering the original source page description files, resulting in either shadow boxes or actual rendered images to be displayed on the visual display device. The proof print function prints a visual representation on a desktop printer, plotter or other printing device (not shown) coupled to imagesetter 16 prior to a final print on imagesetter 16. Again, display of the sheet in printed form on a lower resolution output display device prior to final printing allows a user to adjust layout parameters as required prior to printing a final image on the media. Layout generation utility 50 may also include a data translator for converting files from one format (an original equipment manufacturer (OEM) proprietary format, for example) to a second format (PDF, for example) which may be interpreted by interpreter 54. The data translator is invoked for all such files and the resultant files may be stored in file storage 25.

Layout generation utility 50 may receive order information and signature data from a user defining the ordering of files to be printed and a signature. A signature includes media information, transformation matrix information, clipping information, fold, cut and bind parameters and RIP parameters. Upon receipt of the ordering information, layout generation utility 50 may be invoked to map the file information (page size) into the signature to generate a list of sheets and surfaces to be processed. This list may be used to create a job ticket for transfer to assembler 52. Alternatively, a job ticket may be generated by a routine executed on an external computer and may be provided directly to assembler 52. Preps by ScenicSoft Corporation of Everett, Wash. is an example of a layout generation utility application which may be used to create a job ticket. Job tickets are discussed in greater detail below in association with FIGS. 3 and 4.

Assembler 52 processes user requests received in the form of a job ticket and generates an ordered list of objects to be processed by interpreter 54 and RIP 56. In one embodiment, the list is ordered based on a layer order. That is, objects that are to be printed in the same layer are grouped, and the layers are ordered according to a user preference for the printing of the individual layers in the final output. Assembler 52 receives as an input a job ticket from either computer 12 or layout generation utility 50 and outputs an object list 53 to interpreter 54 for processing.

Figure 2:
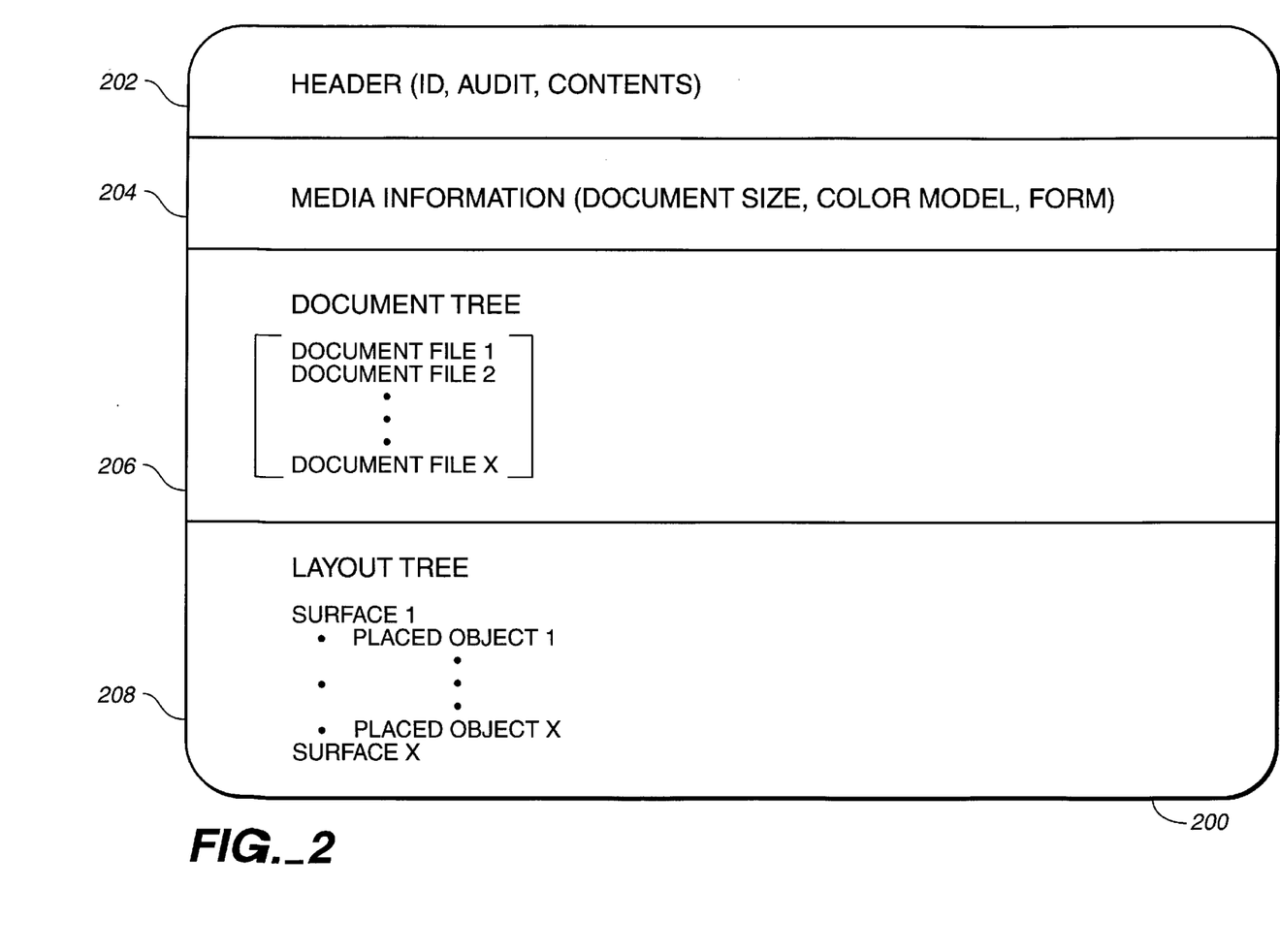
FIG. 2 is functional block diagram of a job ticket according to the invention.
Figure 3A:
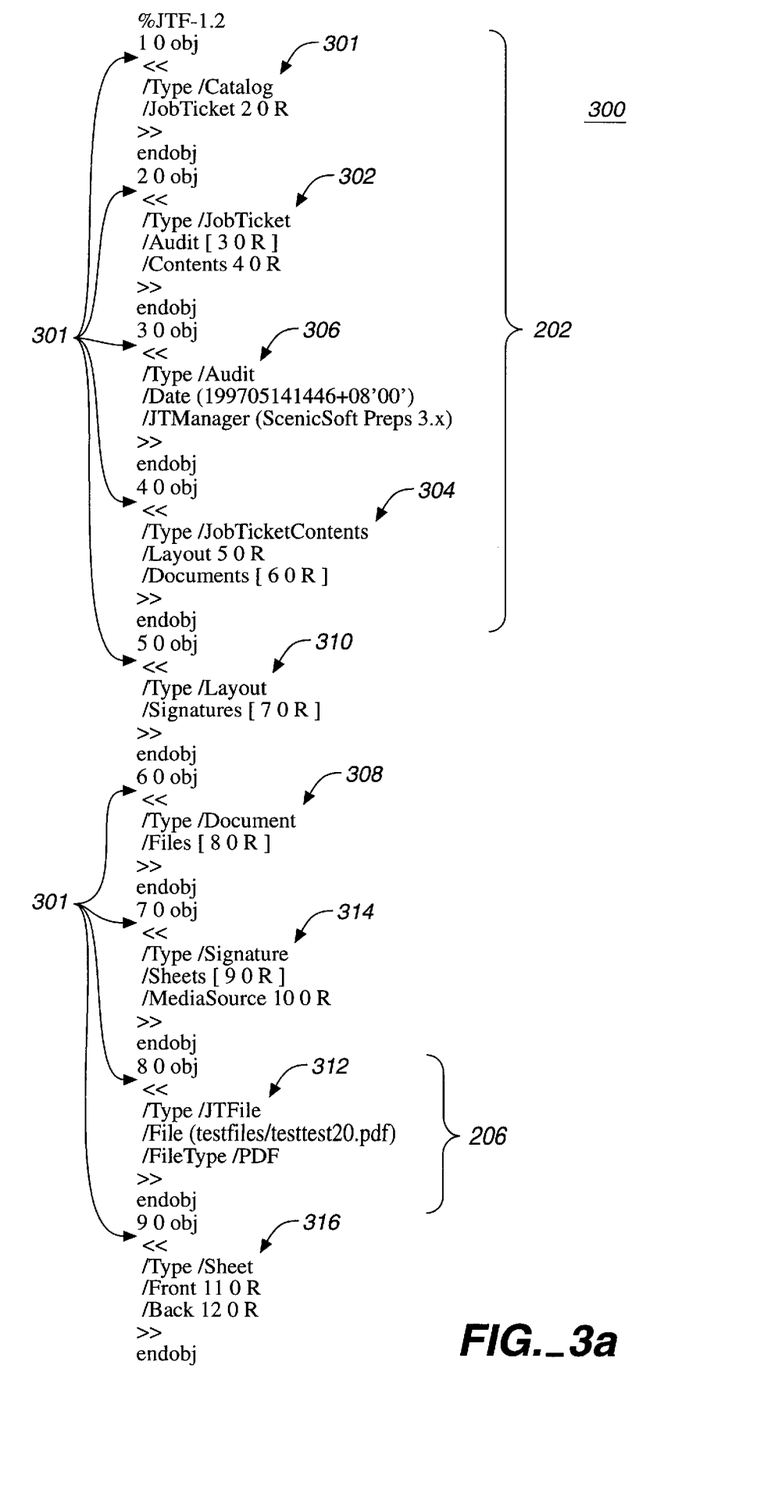
FIGS. 3a–3e show an example of a job ticket for use with the present invention.
Figure 3B:
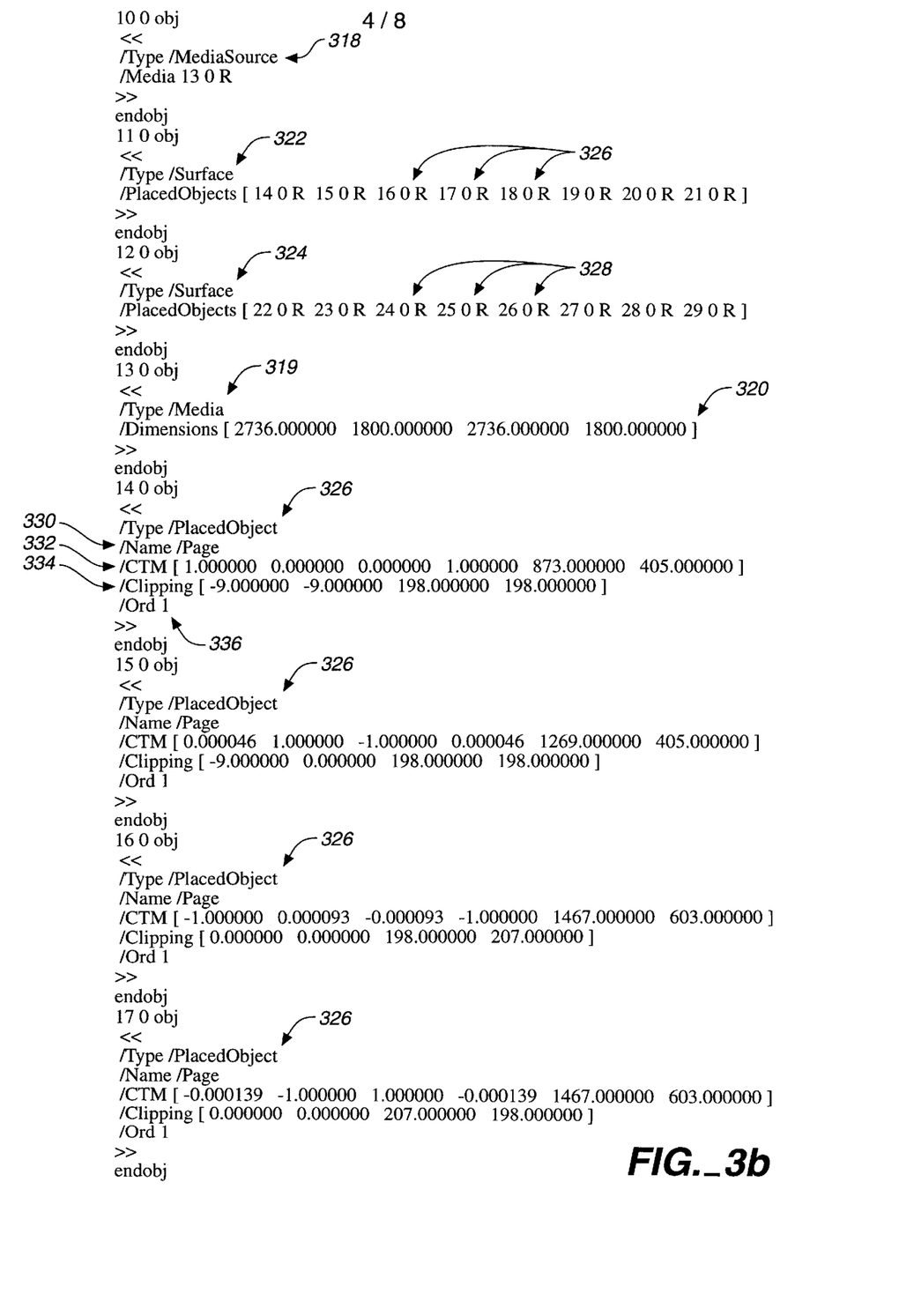
Figure 3C:
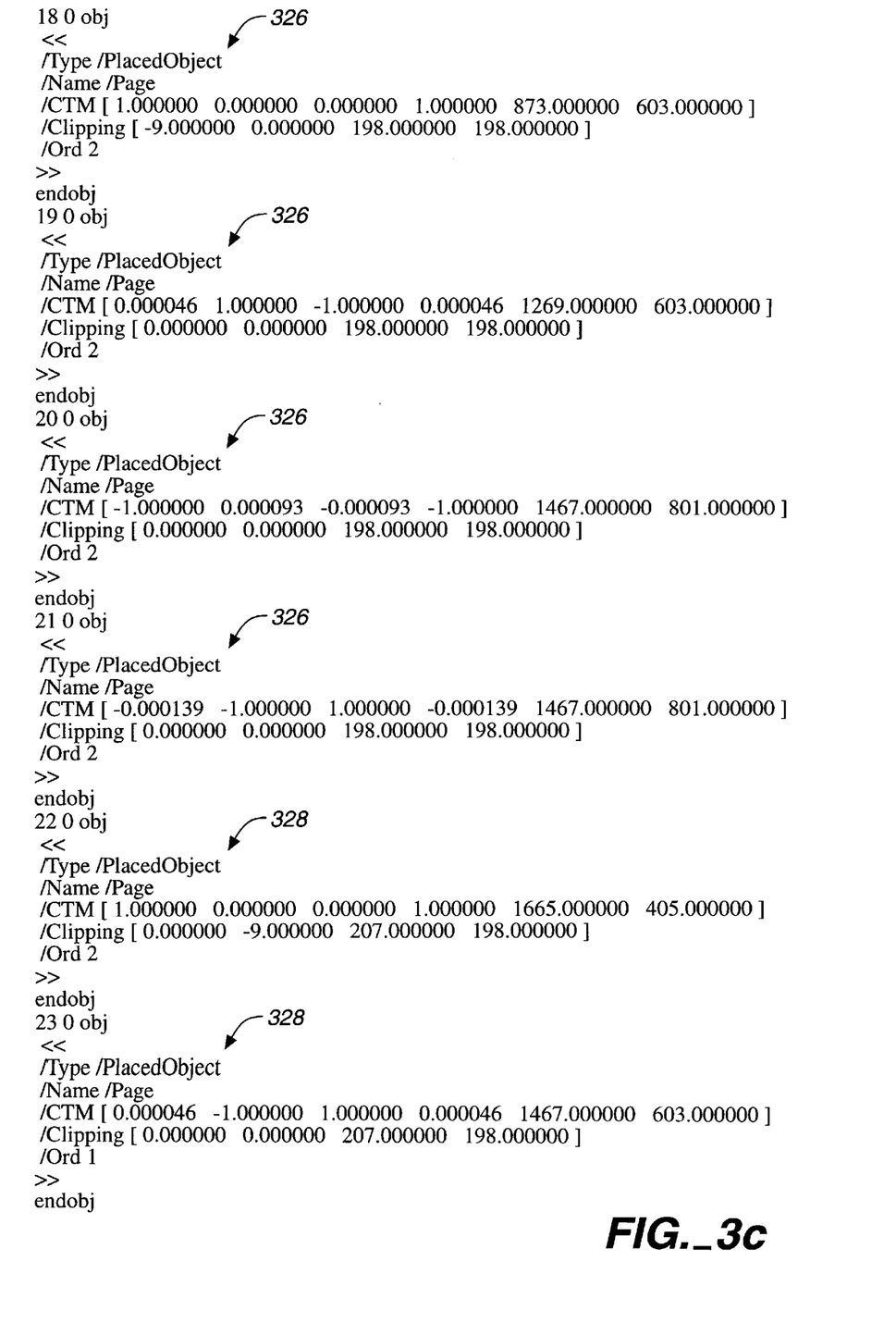
Figure 3D:
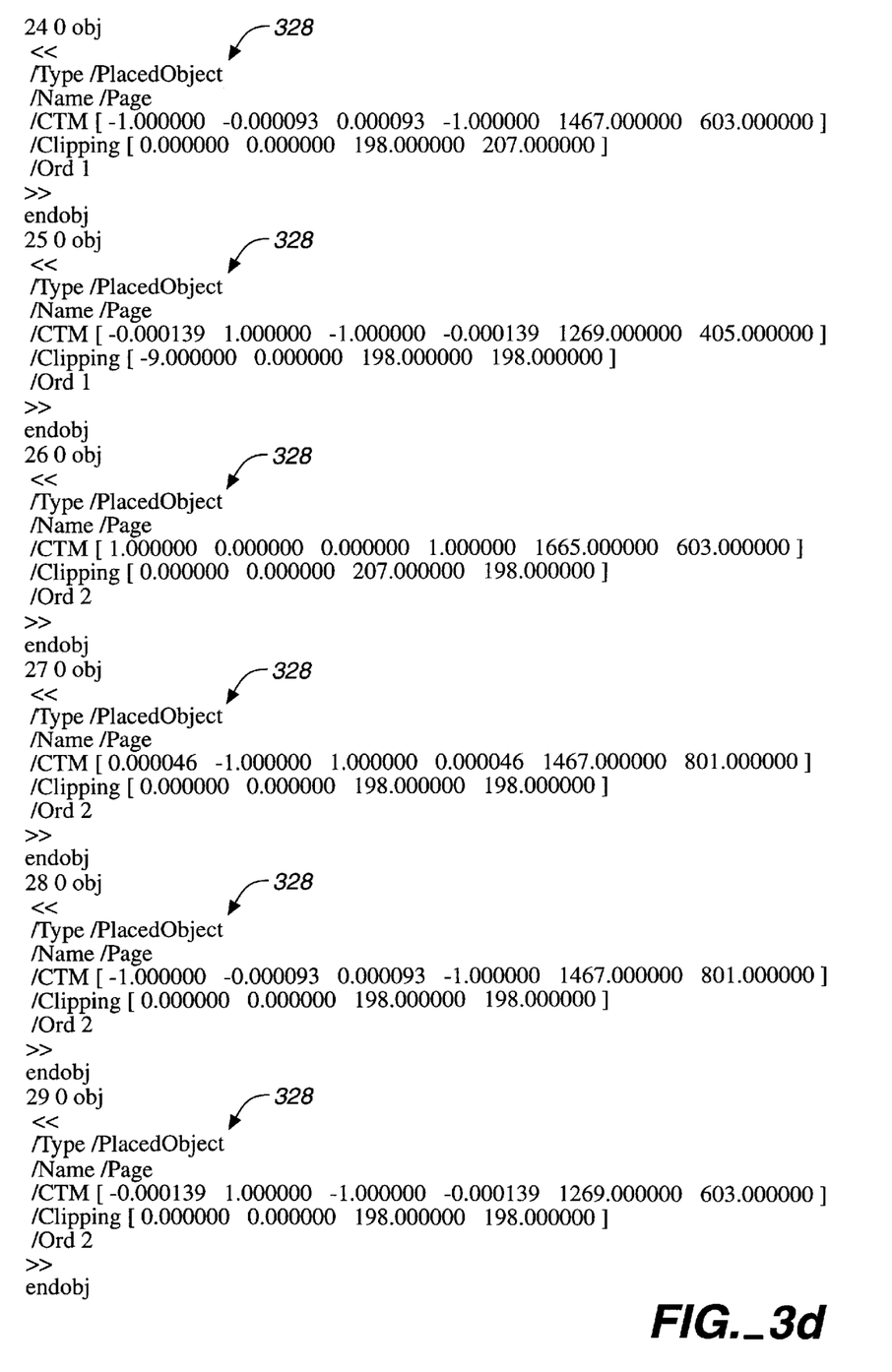
Figure 3E:
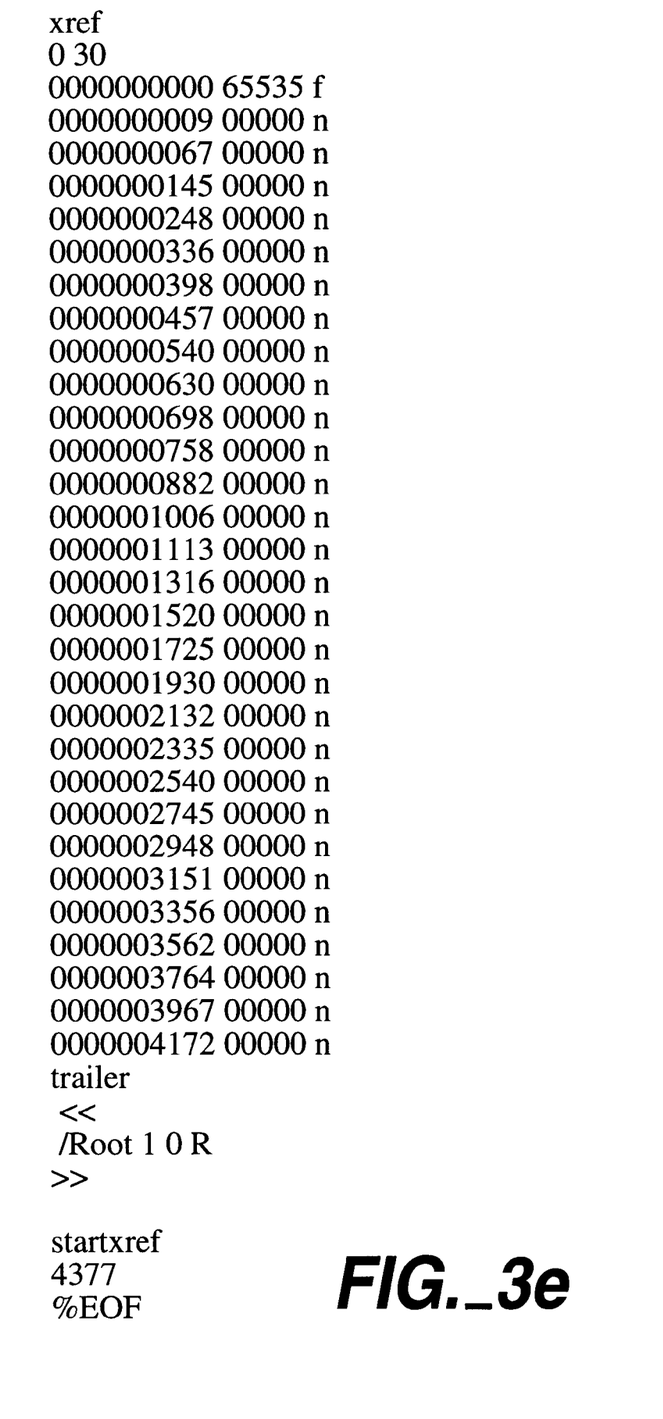

Referring now to FIG. 2, a job ticket 200 describes the layout of pages for one or more sheets in a given job. The layout defines the specific placement of pages on a sheet in view of media considerations (including the type of media and thickness of sheets) and in accordance with user selected post printing requirements such as folding, cutting, stacking and binding operations. Job ticket 200 may be generated by computer 12 and includes a header 202, media information 204, a document tree 206 and a layout tree 208. Header 202 identifies a particular job ticket. Media information 204 includes information for identifying a media type including the dimensions of the target media. Document tree 206 includes a list of files and respective pages in the files which are to be placed in the final printed sheet. Layout tree 208 includes a list of layout objects which define exactly where and how a particular document object (page or file) in document tree 206 is to be placed on the media. As was described above, a job ticket may be provided from computer 12, or generated by a layout generation utility resident in or external to imagesetter 16. In one embodiment, job ticket 200 is coded such that the various sub-components of the job ticket are described by one or more objects.

Referring now to FIGS. 3a–3e, a detailed example of a job ticket 300 for use with an imagesetter is shown. Job ticket 300 includes a plurality of objects 301. Header 202 includes a general header 301 and a header object 302 that points to a content object 304 and an audit object 306. Audit object 306 includes the date and author of the particular job ticket. Content object 304 includes a document object 308 and a layout object 310 which define the document and layout trees respectively for job ticket 300.

Document object 308 includes a single file object 312. For this particular job ticket, single file object 312 represents the entire document tree 206 for job ticket 300. Alternatively, a plurality of file objects can be defined in a job ticket, each including one or more pages of content (or portions of pages) to be displayed in a final image.

Layout object 310 includes a signature object 314. Signature object 314 includes a sheet object 316 and media source object 318. Media source object 318 indicates a media object 319 which defines dimensions 320 for the media target which is to be printed.

Sheet object 316 defines two surfaces to be imaged, a front object 322 and a back object 324, indicating that both the front and the back of the media are to be printed. Front object 322 includes a plurality of placed objects 326 that are to be placed on the front surface of the media. Back object 324 includes a plurality of placed objects 328 that are to be placed on the back surface of the media.

Each placed object 326 and 328 includes a name 330, a transformation matrix 332, a clip path 334 and a reference 336 to the document tree 206. Transformation matrix 332 defines where on the sheet surface a particular object indicated by reference 336 is to be placed. Clip path 334 indicates any clipping to be done to the particular object indicated by reference 336 prior to placement at the location indicated by transformation matrix 332. Reference 336 indicates a particular page ("Ord 1" indicates the first page, "Ord 2", the second page, and so on) in a document file of document tree 206. In this example, only one document file is indicated, so no specific reference to a particular document file is required. Placed objects 326 and 328 form the layout tree 208 for this particular sheet. A job ticket specification including parameter information for all the available object types and formats associated therewith may be found in Appendix A entitled "Adobe Job Ticket Specification", which is attached to this specification and expressly incorporated herein by reference.

Referring again to FIG. 1, interpreter 54 interprets each object indicated by object list 53. In one embodiment, interpreter 54 interprets objects received and stores the interpreted object data in lists (display lists) sorted by band. The display lists may be resident in RAM 28 (for example in display list memory 60) or on disk. The storage of objects in bands will be described in greater detail below in association with RAM 28. Alternatively, interpreter 54 may pass the interpreted object data directly to RIP 56 for immediate processing.

RIP 56 renders object data stored in display list memory (or object data received directly from interpreter 54) and produces pixelmaps for storage in frame buffer 62 in RAM 28. After all of the objects associated with a given sheet (surface) have been processed by RIP 56, the pixelmap data stored in frame buffer 62 may be applied to the media by printing engine 34.

In one embodiment, RIP 56 includes an interpreter. In this configuration, RIP 56 interprets the object data from the original source material files (page description language files), and stores information about the object in display list memory 60. After all of the objects associated with a given sheet have been interpreted, the display list data my be rendered into bands of pixelmap data. As each band is rendered it may be applied to the media by print engine 34.

RAM 28 is a random access memory used by the processor (sub-processors 50–58). RAM 28 may include display list memory 60 and a frame buffer 62. Display list memory 60 is used to store one or more lists, one for each band designated for a particular media image. Each list stores objects or portions of objects representative of data to be displayed in a particular band of an output image.

Pixelmaps produced by RIP 56 may be compressed prior to storage in frame buffer 62. Accordingly, RAM 28 may also include an uncompressed band buffer memory (not shown) for storing uncompressed pixelmaps drawn by RIP 56 and frame buffer 62 may store compressed pixelmaps.

RAM 28 may be embodied in one or more memory chips. If display list memory 60 and the frame buffer 62 are consolidated into a single memory (a consolidated memory), then the memory may be partitioned or otherwise mapped to reflect the boundaries of the various memory sub-components.

Data flow, rather than physical interconnection, is illustrated between elements of imagesetter 16. Processor and memory components are physically interconnected using a conventional bus architecture.

The imagesetter components that have been described can be packaged in a single product; alternatively, some can be included in computer 12 or otherwise housed separately.

Figure 4:
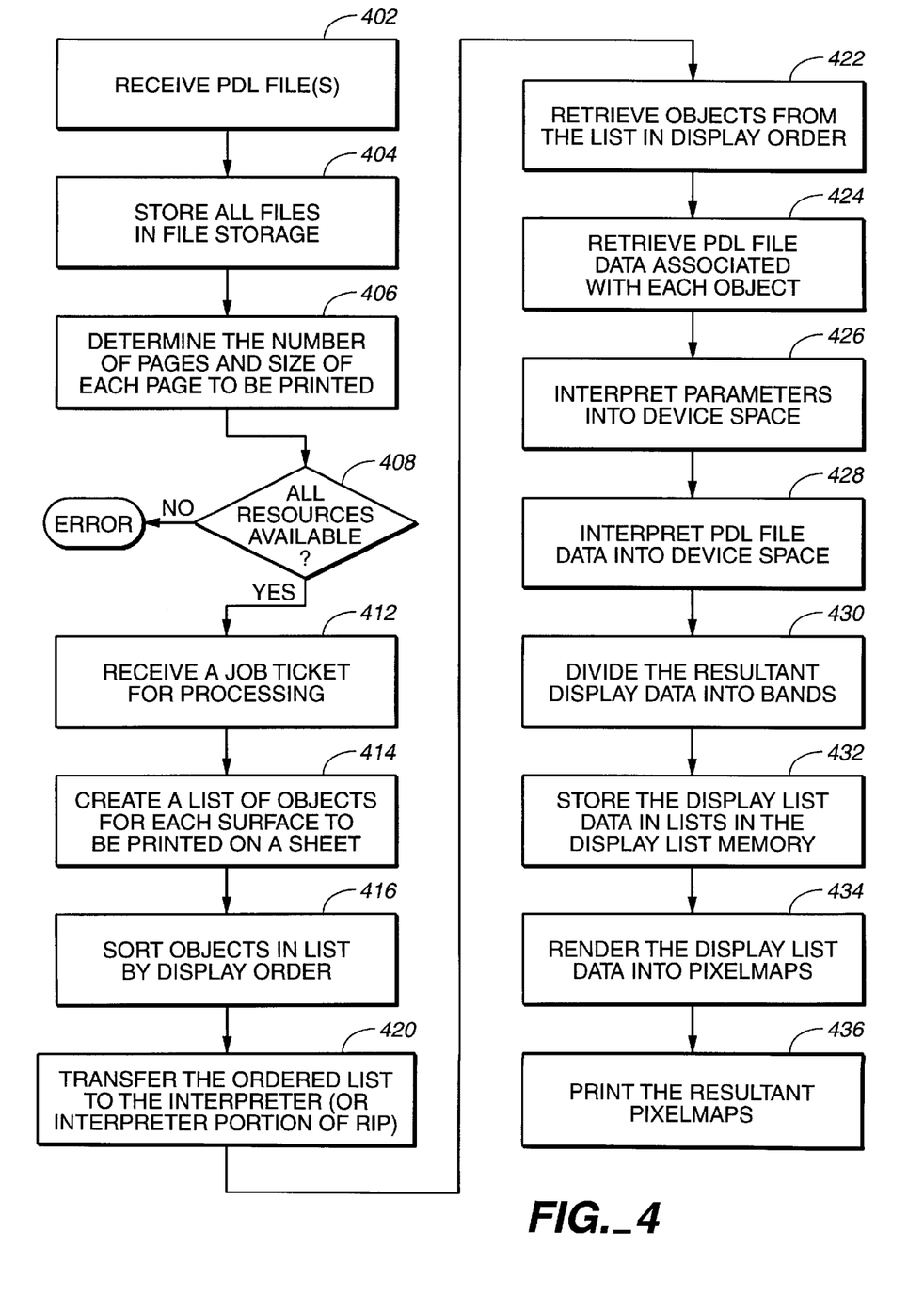
FIG. 4 is a flow chart for a rendering and marking process for a raster output device including imposition in the RIP process according to the invention.

Referring now to FIGS. 1 and 4, a conventional rendering and marking process for a raster output device is enhanced by the addition of a method 400 of imposition in the RIP process. Imagesetter 16 receives one or more PDL files representative of pages or sub-pages to be displayed on a given sheet from computer 12 (402). The files are transferred to file storage 25 for storage until the interpreter 54 process is invoked (404).

Layout generation utility 50 processes each file to determine the size and numbers of pages associated with a give sheet of output (406), and verifies the availability of resources required to print the respective file (408).

Assembler 52 receives a job ticket associated with one or more sheets to be processed (412). The job ticket defines both media requirements, document location and layout for each content element to be placed in a final sheet. In one embodiment, assembler 52 waits until all of the files associated with a given sheet have been received and stored in file storage 25 before beginning the assembly process. Alternatively, assembler 52 may begin the assembly process after the job ticket and a first file is received.

Assembler 52 processes each job ticket and creates for each surface (where a sheet may have more than one surface, e.g., top surface and bottom surface of a single sheet) a list of objects which describe all the objects (graphics and text) to be printed for a given surface (414). Each entry includes an object name, transformation matrix information and clipping information associated with the object which is derived from the job ticket. The list may be sorted based on printing order for bands in the surface (416). Assembler 52 creates the list by examining the layout tree for a given sheet from the job ticket. As was described above, the layout tree includes transformation matrix information that details the position of each object to be placed on a given sheet surface.

Assembler 52 transfers the ordered list to interpreter 54 for processing (420). Interpreter 54 retrieves the first object from the ordered list (422). Then, based on the object name information for the entry retrieved in step 420, the interpreter retrieves the associated data (text and/or graphics) from file storage 25 (424). Interpreter 54 interprets the parameters associated with each object in graphics space converting such into device space for each object in the ordered list (426). Specifically, the interpreter instantiates the transformation matrix and clipping path into the interpreter's graphics state. Interpreter 54 uses the derived clip path information to clip data for an associated page description input file during the interpretation of the file data (during step 428). Interpreter 54 interprets the data from the associated page description input file to produce display data by transforming generic page description instructions from graphics space into device space (428).

In one embodiment, interpreter 54 divides and sorts the resultant interpreted display data (based on its respective location in the final image as defined by the transformation matrix data derived in step 426) into one or more bands associated with the output media (430). In this embodiment, a resultant image is divided into one or more non-overlapping bands. Each band may contain one or more objects (display data) or portions of objects. RAM 28 includes a display list memory having a display list for each band to be printed. Display data derived from the interpretation process of step 428 is stored in display list memory (432). When all of the objects for a given surface have been stored in display list memory, then RIP 56 renders the display list data into pixelmaps (434). Then the resultant pixel data may be painted into the frame buffer 62. Alternatively, the resultant pixel data may be painted into band buffers of varied size (typically 256 or 512 scan lines in size) rather than a frame buffer.

The display data generated by interpreter 54 may be passed directly to RIP 56 for rendering immediately into frame buffer 62. Low resolution digital presses and the like that typically include resolutions on the order of 300 to 800 dpi (dots per inch) for printed matter generally render the display data directly into the frame buffer. In imagesetters and other devices where the resolution requirements are greater, display lists are generally used.

After all of the display data is rendered by RIP 56, the resultant pixelmap data may be sent to print engine 34 for printing the particular surface (436). The pixelmap data may be sent to the print engine a band at a time as soon as the bands are rendered. Alternatively, the pixelmaps may be stored in a data storage mechanism (such as file storage 25) for printing at a later time.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method imposing and rendering image data for a surface to be printed on a single media sheet by a printing device, the method comprising:

receiving one or more page description files defining a plurality of non-overlapping pages to be printed on the surface of the single media sheet;

imposing a layout for the sheet without interpreting original source material from the individual page description files including receiving a job ticket defining the layout of the plurality of pages on the surface and constructing an ordered list of objects for the surface from the job ticket;

interpreting data directly from the page description files resulting in display data and rendering the display data to create pixelmaps; and printing the pixelmaps on the surface of the single media sheet.

2. The method of claim 1 wherein the page description files are PDF files.

3. The method of claim 1 further including translating all page description files received into PDF files prior to rendering.

4. The method of claim 1 wherein the printing device is selected from the group of an imagesetter, a digital press, a printing press and a plate setter.

5. The method of claim 1 further including the steps of:

if no job ticket is received, building a job ticket, including processing a user defined signature describing the position of each page on the media sheet;

determining the numbers and size of pages to be printed from each page description file received; and creating a job ticket by mapping the page size into the signature to determine a list of objects to be printed for each surface of the media sheet.

6. The method of claim 1 wherein the step of interpreting further includes dividing the display data into bands and storing the display data in a display list memory until all the pages are interpreted.

7. The method of claim 6 further including sorting the layer ordered list of objects according to band order.

8. The method of claim 1 further including verifying the availability of all resources called in each page description file received.

9. The method of claim 1 further including printing a proof on a second printing device prior to printing on the media sheet.

10. The method of claim 1 further including displaying a visual representation of the sheet on a visual output device prior to printing on the media sheet.

11. A method printing a sheet by a printing device comprising:

receiving one or more files including a plurality of pages of content for display on the sheet;

storing the files in a file storage device;

imposing a layout for the sheet without interpreting original source material from the individual files including receiving a job ticket including a layout and document tree, the document tree defining which pages in the files are to be printed on the sheet and the layout tree defining the location on the sheet for each page in the document tree and deriving an object list from the job ticket including an entry for each page to be printed on the sheet where entries in the object list are arranged in layer order and each entry includes a pointer to a page in the files stored in the file storage device;

interpreting objects from the object list in layer order including retrieving associated pages from the file storage device and interpreting page data to create display data;

storing the display data in display lists;

when all the objects from the object list have been interpreted, rendering the display list data in the display lists to create pixelmaps; and printing the pixelmaps on the sheet.

12. A method rendering an image on a sheet of media in an imagesetter configured to receive a page description language description of a plurality of pages to be printed on the sheet and having a display list memory for storing display list objects, the method comprising:

imposing a layout for the sheet without interpreting original source material from the individual page description language descriptions including deriving an ordered list of objects from user defined layout information for the sheet;

interpreting the page description language descriptions according to a layer order defined by the ordered list into display list objects stored in the display list memory; and rendering the display list data.

13. The method of claim 12 wherein the page description language description of pages are PDF files.

14. The method of claim 12 further including translating all page description language descriptions received into PDF files prior to rendering.

15. The method of claim 12 wherein the step of deriving an ordered list of objects includes receiving a job ticket defining the layout of the pages to be printed on the sheet.

16. The method of claim 12 wherein the step of deriving an ordered list of objects includes building a job ticket by processing a user defined signature describing the position of each page on the sheet;

determining the numbers and size of pages to be printed from each page description language description received; and creating a job ticket by mapping the page size into the signature to determine a list of objects to be printed for each surface of the sheet.

17. The method of claim 12 further including sorting the ordered list of objects according to band order.

18. The method of claim 12 further including verifying the availability of all resources called in each page description language description received.

19. An imposition method for defining the layout of a sheet to be printed by a printing device, the sheet including a plurality of pages of content defined by one or more page description files, the method comprising:

receiving one or more page description files defining a plurality of pages for display at a same time on the sheet;

receiving user input defining a user layout for the pages on the sheet; and imposing a layout for the sheet without interpreting the received page description files and without creating an intermediary page description file including the page description files, the imposing step including building a job ticket having an ordered list of objects to be rendered on the sheet, the job ticket derived from the user layout input and provided along with the received page description files to a printing device for printing of the sheet.

20. The method of claim 19 where the ordered list is sorted in layer order.

21. The method of claim 19 wherein the page description language files are PDF files.

22. The method of claim 19 wherein the step of imposing includes receiving a user defined signature defining the layout of the pages to be printed on the sheet.

23. The method of claim 19 wherein the step of building a job ticket includes processing a user defined signature describing the position of each page on the sheet;

determining the numbers and size of pages to be printed from each page description file received; and creating a job ticket by mapping the page size into the signature to determine a list of objects to be printed for each surface of the sheet.

24. The method of claim 19 further including verifying the availability of all resources called in each page description file received.

25. A method of printing multiple non-overlapping pages on a single sheet by a printing device, the sheet including multiple pages of content defined by one or more page description files, the method comprising:

receiving one or more page description files defining multiple non-overlapping pages for display on the sheet;

receiving user input defining the layout of the pages on the sheet;

imposing a layout for the sheet without interpreting the received page description files and without creating an intermediary page description file including original page description file data, the imposing step including building a job ticket having an ordered list of objects to be rendered on the sheet;

interpreting data from the page description files resulting in display data;

rendering the display data to create pixelmaps; and printing the pixelmaps on the sheet.

26. A printing device configured to receive a plurality of page description language descriptions of pages to be printed at a same time on a sheet, comprising:

an assembler configured to receive a job ticket including layout and page identifier information and operating to impose a layout for the sheet without interpreting original source material from the individual page description language descriptions including generating an ordered list of objects to be printed by the printer on the sheet;

an interpreter connected to receive page description language input and the ordered list and operating to generate display list objects for each object in the ordered list and cause display list objects to be stored in a display list memory;

a rendering engine coupled to the display list memory and operating to receive display list objects stored in the display list memory and to render the objects; and a print engine for printing the rendered objects on the sheet.

27. The printing device of claim 26 wherein the page description language descriptions are PDF files.

28. The printing device of claim 26 further including translating all page description language descriptions received into PDF files prior to rendering.

29. The printing device of claim 26 wherein the printing device is selected from the group of an imagesetter, a digital press, a printing press and a plate setter.

30. The printing device of claim 26 further including a layout generation utility receiving as an input a user defined signature describing the position of each page on the sheet and operating to determine the numbers and size of pages to be printed from each page description language description received and to create a job ticket by mapping the page size into the signature to determine a list of objects to be printed for each surface of the sheet.

31. The printing device of claim 26 further including a sorting mechanism for sorting the ordered list of objects according to band order.

32. The printing device of claim 26 further including a resource verifier operating to verifying the availability of all resources called in each page description language description received.

33. The printing device of claim 26 further including proof print routine operating to cause the printing of a proof on a second printing device prior to printing on the sheet.

34. The printing device of claim 26 further including an on-screen display routine operating to cause the display of a visual representation of the sheet on a visual output device prior to printing on the sheet.

35. A computer program, residing on a computer-readable medium, having instructions for causing a raster output device to:

receive one or more page description files defining a plurality of pages to be printed at a same time on a surface of a media sheet and a job ticket defining the layout of the pages on the surface;

impose a layout for the media sheet without interpreting original source material from the individual page description files including constructing an ordered list of objects for the surface from the job ticket;

interpret data from the page description files resulting in display data and render the display data to create pixelmaps; and print the pixelmaps on the surface of the media sheet.

* * * * *